Feb. 7, 1939.　　　G. A. ZINK　　　2,145,962
FLOATING PLASTIC BRONZE FACED BEARING
Filed Nov. 30, 1936
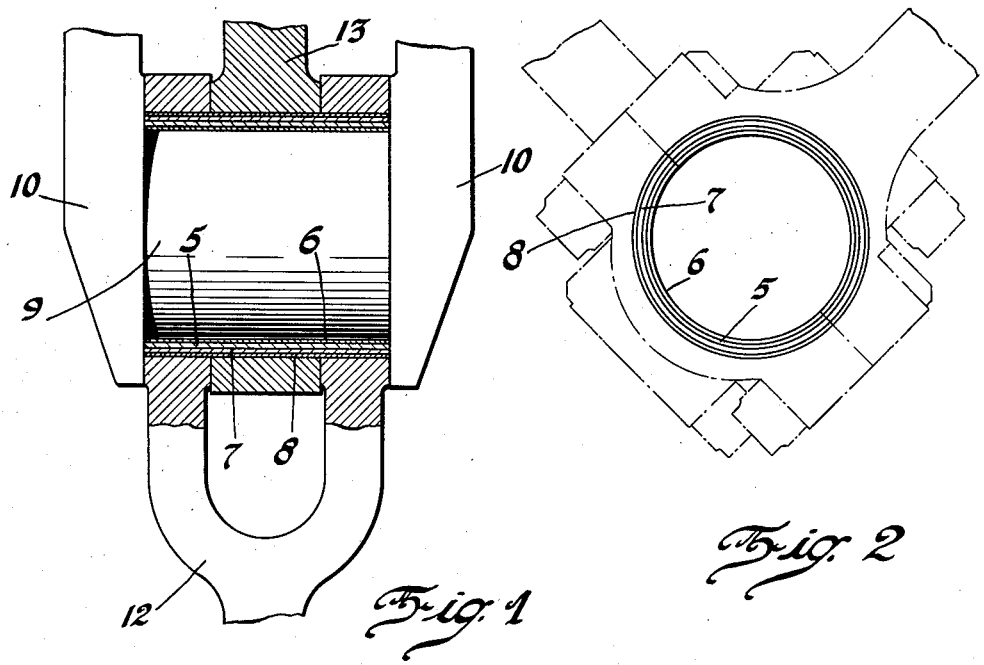
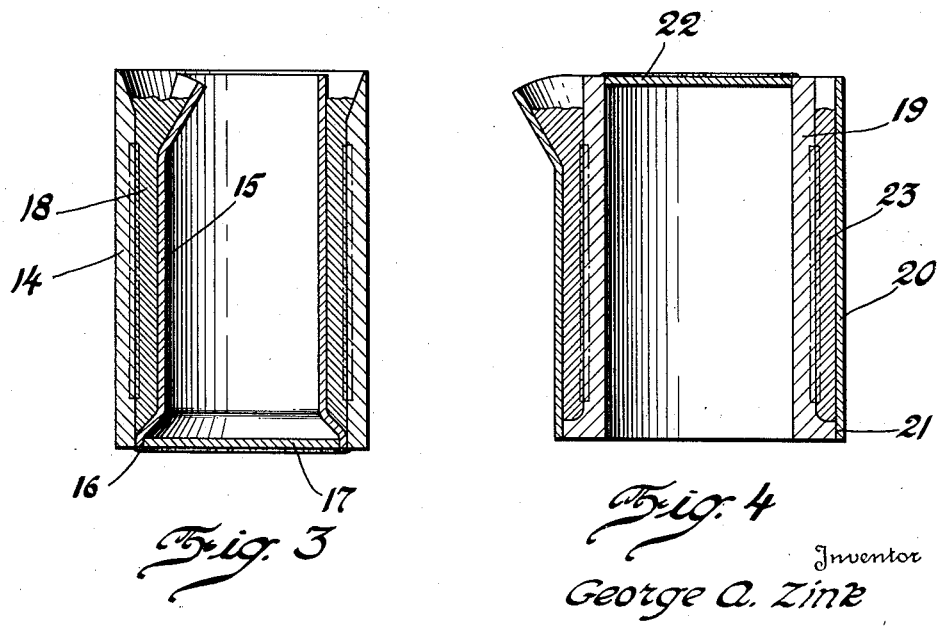
Inventor
George A. Zink Patented Feb. 7, 1939

2,145,962

UNITED STATES PATENT OFFICE 2,145,962

FLOATING PLASTIC BRONZE FACED BEARING

George A. Zink, Indianapolis, Ind., assignor to General Motors Corporation, Detroit, Mich., a corporation of Delaware Application November 30, 1936, Serial No. 113,329

4 Claims. (Cl. 308—237)

My invention relates to and the object thereof is to provide an improved bearing of the type comprising a tubular sleeve member (or two semicylindrical members which together provide a tubular sleeve member), and which sleeve member has thin layers of antifriction bearing metal autogenously welded or fused to its inner and outer surfaces, so as to be integral therewith and inseparable therefrom. Such bearings are used particularly as crank pin bearings in V-type and radial engines wherein several connecting rods act upon a single crank pin in which case the inner layer of bearing metal runs in contact with the steel crank pin, and bearing seats formed at the inner ends of the connecting rods (or a bearing seat at the inner end of a single master rod usually used in radial engines) runs in contact with the outer layer of antifriction bearing metal. Both layers as will be understood are fused to the intervening sleeve member of the bearing regarded in its entirety and form in effect and in fact unitary parts thereof; and said layers are so thin that they would not endure in the service for which the bearing is required were they not bonded to the sleeve member which, as will be appreciated, provides a support for the bearing metal layers. The intervening sleeve member itself is made up of two concentrically arranged parts hereinafter specifically designated as "supporting members"; said supporting members are made, preferably, of iron or steel, and they provide the requisite strength in the bearing as a whole; and the inner and outer layers of antifriction bearing metal are made, preferably, of high lead or "plastic" bronze, which is a comparatively weak material and would not endure in the service required of finished bearings were the layers not so united with the supporting members as to be in effect integral with them.

An improved bearing made in accordance with my invention is illustrated in the accompanying drawing and described in the following specification, and the features wherein the same consists are particularly pointed out in the concluding claims.

In the drawing wherein the preferred embodiment of my invention is illustrated:

Figure 1 is a view showing how my improved bearing may be used with connecting rods of the fork and blade type in V-type internal combustion engines.

Figure 2 is a view showing the bearing and rods shown in Figure 1, in side elevation.

Figure 3 is a view used to explain the way in which the inner of the two parts of my improved bearing is made.

Figure 4 is a view similar to Figure 3 used to explain how the outer one of the two parts which together form my improved bearing is made.

Referring now to the drawing, the bearing illustrated comprises an inner supporting member 5 having a thin layer of bearing metal 6 fused to its inner surface so as to be inseparable therefrom, and an outer supporting member 7 having a thin layer of bearing metal 8 fused upon its outer surface and likewise inseparable from said outer member. The supporting members 5 and 7 are preferably made of iron or steel the carbon content of which is so low that it will not harden upon being suddenly cooled from a high temperature; and the bearing metal layers 6 and 8 are preferably of high lead or "plastic" bronze, which is a particularly good antifriction bearing metal. As examples of plastic bronze I have secured satisfactory results using mixtures or alloys comprising from 30% lead and 70% copper, to 50% lead and 50% copper.

The layers 6 and 8 are extremely thin, around one thirty-second of an inch in thickness in representative bearings for automobile engines, and have little strength in themselves; the permanence of the bearing layers when the bearing is in use being dependent upon the fact that said layers are autogenously welded or fused to the supporting members 5 and 7 throughout the entire areas of contact between the two supporting members and their facing layers, of plastic bronze or equivalent antifriction bearing metal.

The supporting members 5 and 7 are in contact with one another throughout (the contacting surfaces being steel as will be appreciated), and said members are permanently secured together as by electrical welding at their exposed ends along the joint between said members, so as to form single unitary bearings. The parts of the bearing subjected to wear are obviously the inner and outer layers of the composite bearing members provided by the two supporting members and their layers of antifriction metal as herein explained.

My improved bearing illustrated in Figures 1 and 2 is made up of two semicylindrical half bearing members so that the same may be placed upon a crank pin 9 between crank arms 10, 10 of a crank shaft, and in such cases the forked connecting rod 12 and the blade rod 13 have detachable caps so that the parts may be assembled; although in certain engines (radial engines for example) wherein the crank pin projects from a crank arm or disc and is free at its outer exposed end I prefer that the bearing shall be of tubular form, that is not split longitudinally to provide two semicylindrical bearing members.

When my improved bearing is of tubular form the inner bearing metal layer runs upon the crank pin, and a bearing seat at the inner end of a master connecting rod runs against the outer layer of bearing metal; the bearing being then of the floating type free to rotate both within said bearing seat and relative to the crank pin. When, however, the bearing is made up of two half bearings it is preferably restrained against rotation relative to one of the rods; although both parts may be left free to rotate within and relative to the bearing seats at the ends of the connecting rods of V-type engines, as illustrated in Figures 1 and 2. In all cases the crank pins and connecting rods are assumed to be of steel so that rubbing contact is between steel surfaces and the plastic bronze or equivalent antifriction layers 6—8 upon the supporting members.

Figure 3 illustrates the way in which the inner supporting member is provided with an inner layer of plastic bronze or equivalent bearing metal. An outer iron or steel shell 14 considerably thicker than but from which the supporting member 5 is formed is assembled with an inner tube 15 spaced therefrom, as shown; the two being welded together at their lower ends, as at 16, and the mold assembly thus formed being also closed at its lower end by a circular plate 17.

The bearing forming assembly or mold is first heated to a bright red or white hot temperature; and molten plastic bronze or equivalent bearing metal 18 to provide the layer 6 is poured into the annular space between the shell 14 and the tube 15. Then and as promptly as possible the highly heated mold assembly containing the molten bearing metal is dipped into a tank of water up to near but not below its upper end, whereby the assembly is rapidly cooled from the outside thereof inward and through the bronze bearing metal. This freezes the molten plastic bronze before the constituents thereof can separate from one another and secures a uniform distribution of the lead throughout a matrix of copper which, because of its higher melting temperature, becomes solid in advance of the lead.

The ends of the mold assembly are next cut off, the inner tube 15 is removed, and surplus material of the steel shell 14 and of the bronze 18 is removed by any suitable metal marking machine to provide proper thicknesses of the supporting member 5 and of the lining 6 of the finished bearing member.

Figure 4 illustrates the way in which the outer supporting member is provided with an outer layer of antifriction bearing metal, such as plastic bronze. An inner iron or steel shell 19 thicker than but from which the supporting member 7 is formed, is provided with an outer spaced tubular part 20; the two being welded together at their lower ends, as at 21. The upper end of the mold assembly thus formed is closed by a circular disc 22.

This bearing forming assembly or mold is likewise heated to a high temperature, the same as the assembly illustrated in Figure 3, and molten plastic bronze 23 is supplied to the annular space between the shell 19 and tube 20 to provide the bearing layer 8 of the finished bearing. The mold assembly is next suddenly cooled to produce the results enumerated in describing Figure 3, but in this case the cooling water is supplied through a pipe (not shown) over which the assembly is placed and impinges against the inner surface of the shell 19, the cooling being thus from the inside of the shell outwardly and through the plastic bronze 23 which surrounds said shell.

The cooled mold assembly as next finished as hereinbefore explained to provide proper thicknesses of the supporting member 7 and of the bearing metal 8 in the finished bearing.

My improved bearing whether it is to be of tubular form, or to be in the form of two half bearing members, is first made tubular; and the tube is afterward slitted longitudinally to provide two half bearings if half bearings are to be used. To that end tubular members made as aforesaid from the mold assemblies illustrated in Figures 3 and 4, one having an inside layer and the other an outside layer of bearing metal, are finished close to their final dimensions; the outer diameter of the first being left a little greater than the inner diameter of the second. The last named tube is then heated to expand it (and the first one may be cooled to reduce its diameter if desired), and the two are assembled one within the other. As the temperatures of the two become equalized the outer surface of the member 5 and the inner surface of the member 7, these being steel surfaces, are forced into firm engagement with one another; and the resulting holding together action will often be sufficient, in the case of tubular bearings, to hold the parts together when the bearing is in use. However and as hereinbefore explained, it is preferable that the two steel supporting members even though they are to remain in tubular form be electrically welded together at their ends along the joint between them, and such welding before slitting the tube longitudinally is necessary in case semicylindrical half bearings are to be made by slitting the tube.

Having thus described and explained my invention, I claim and desire to secure by Letters Patent:

1. A bearing comprising two separate supporting members arranged in contact one within the other, the exposed faces of which have each a layer of bearing metal fused thereto; said two members being secured together so as to form a single floating bearing structure.

2. A bearing comprising two separate semicircular supporting members arranged in contact one within the other, the inner exposed face of one of said members and the outer exposed face of the other having a layer of bearing metal fused thereto; said two members being secured together to form a single floating bearing structure.

3. A bearing comprising a tubular supporting member having a layer of bearing metal fused upon the inner surface thereof, and a second tubular supporting member having a layer of bearing metal fused upon the outer face thereof; said members being arranged one within the other with their bearing metal layers exposed, and the two members being secured together so as to form a single floating bearing structure.

4. A bearing comprising two separate supporting members arranged in contact one within the other the exposed faces of which have each a layer of plastic bronze fused thereto; said two members being secured together so as to form a single floating bearing structure.

GEORGE A. ZINK.